(12) United States Patent
Cherian et al.

(10) Patent No.: US 12,223,468 B2
(45) Date of Patent: Feb. 11, 2025

(54) AUTOMATED CONTENT GENERATION IN COMPUTING ENVIRONMENT

(71) Applicant: Dell Products L.P., Round Rock, TX (US)

(72) Inventors: Susana Cherian, Trivandrum (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 17/869,204

(22) Filed: Jul. 20, 2022

(65) Prior Publication Data

US 2024/0029023 A1  Jan. 25, 2024

(51) Int. Cl.
*G06Q 10/101* (2023.01)
*G06F 40/131* (2020.01)
*G06F 40/186* (2020.01)

(52) U.S. Cl.
CPC ......... *G06Q 10/101* (2013.01); *G06F 40/131* (2020.01); *G06F 40/186* (2020.01)

(58) Field of Classification Search
CPC .............................. G06Q 50/04; G06Q 10/101
See application file for complete search history.

(56) References Cited

U.S. PATENT DOCUMENTS

| 12,141,291 B1* | 11/2024 | Rappaport | H04L 63/10 |
| 2018/0210709 A1* | 7/2018 | Bharthulwar | G06F 8/33 |
| 2019/0318222 A1* | 10/2019 | Mallela | G06F 40/40 |
| 2022/0334950 A1* | 10/2022 | Balan | G06F 11/3692 |
| 2023/0067084 A1* | 3/2023 | Mohanty | G06F 8/77 |
| 2023/0261876 A1* | 8/2023 | Kumar | H04L 9/3247 713/168 |
| 2024/0069871 A1* | 2/2024 | Mohanty | G06F 9/451 |

OTHER PUBLICATIONS

Kipyegen, N. J., & Korir, W. P. K. (2013). Importance of software documentation. International Journal of Computer Science Issues (IJCSI), 10(5), 223-228. Retrieved from https://dialog.proquest.com/professional/docview/1477204708?accountid=131444 (Year: 2013).*
T. Lehtonen et al., "Defining Metrics for Continuous Delivery and Deployment Pipeline," Symposium on Programming Languages and Software Tools, Oct. 2015, pp. 16-30.

(Continued)

*Primary Examiner* — Maria C Santos-Diaz
(74) *Attorney, Agent, or Firm* — Ryan, Mason & Lewis, LLP

(57) ABSTRACT

Techniques are disclosed for automated content generation in a computing environment. For example, a method comprises managing one or more pipelines respectively corresponding to one or more item lifecycle stages. Each pipeline of the one or more pipelines comprises a set of data processing elements configured to execute a set of operations associated with a corresponding one of the item lifecycle stages. At least a portion of the set of operations executed in each pipeline comprise one or more content generation operations configured to generate a content fragment to automatically document the corresponding item lifecycle stage. The method then builds a document from at least a portion of content fragments generated by the one or more pipelines.

20 Claims, 11 Drawing Sheets

(56) References Cited

OTHER PUBLICATIONS

Wikipedia, "Continuous Integration," https://en.wikipedia.org/w/index.php?title=Continuous_integration&oldid=1063426859, Jan. 3, 2022, 9 pages.

Wikipedia, "CI/CD," https://en.wikipedia.org/w/index.php?title=CI/CD&oldid=1062446811, Dec. 28, 2021, 2 pages.

Wikipedia, "Continuous Delivery," https://en.wikipedia.org/w/index.php?title=Continuous_delivery&oldid=1054685039, Nov. 11, 2021, 6 pages.

Wikipedia, "Continuous Deployment," https://en.wikipedia.org/w/index.php?title=Continuous_deployment&oldid=1050036713, Oct. 15, 2021, 2 pages.

\* cited by examiner

FIG. 3B

```
 1  {
 2    "Document_Fragment":
 3      "name":"FlexOnDemand",
 4      "Section":"Requirements",
 5      "Sequence":"3",
 6      "style":{
 7        "color":"grey",
 8        "font_size":"20px"
 9      },
10      "style2":{
11        "color":"#fff",
12        "font_size":"black"
13      },
14      "style3":{
15        "tag":"<br></br>"
16      },
17      "query":{
18        "connection_string":"fs_connection_string",
19        "content":"select text from source"
20      }
21  }
```

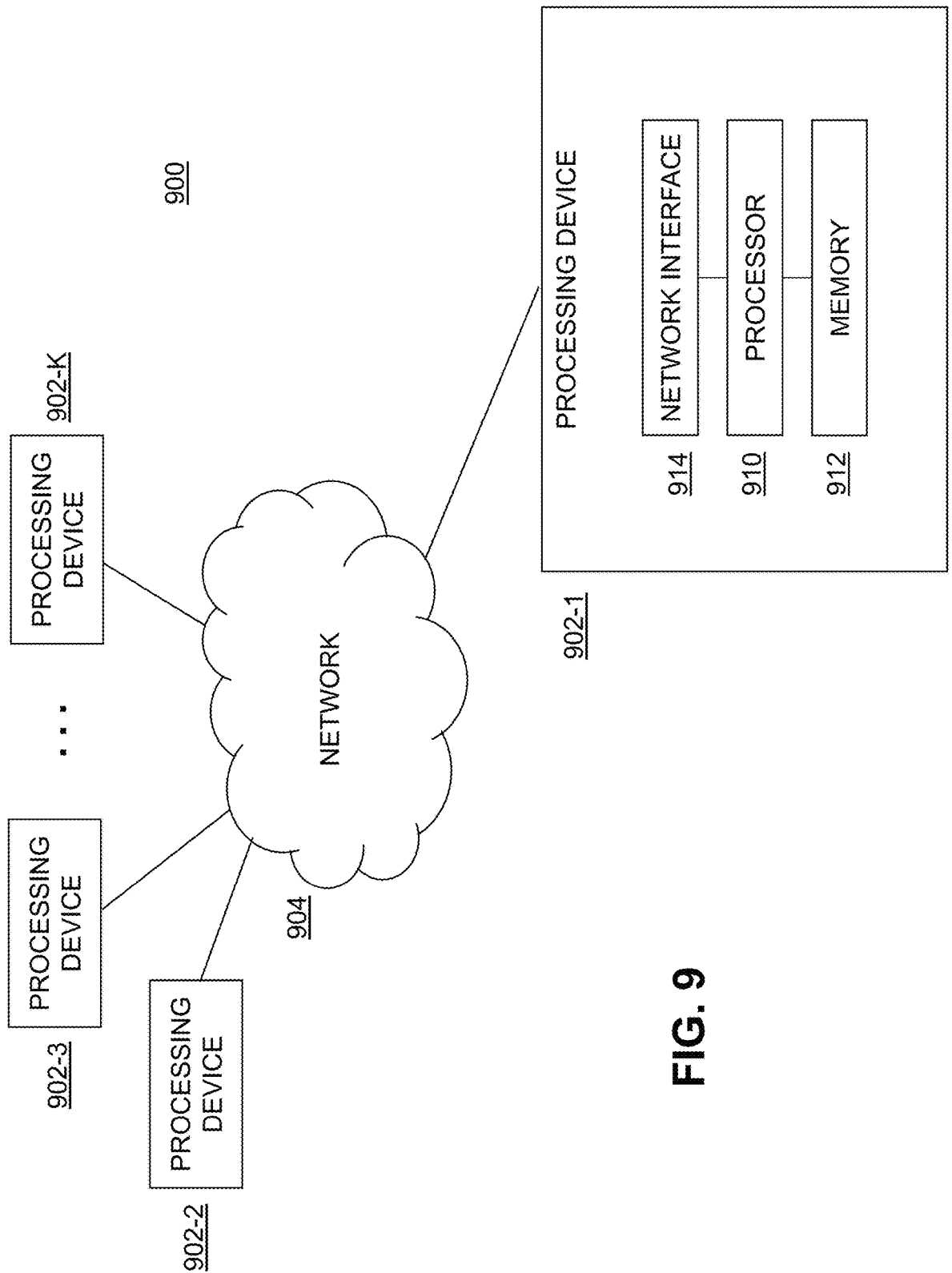

AUTOMATED CONTENT GENERATION IN COMPUTING ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to content generation in such computing environments.

BACKGROUND

Content generation can take on many forms and involve many considerations depending on the application and the enterprise for which the content is being generated. For example, consider a scenario where a new product is being launched by an enterprise such as, by way of example only, a software package offered by an original equipment manufacturer (OEM). Launching a new product, or even a new feature in an existing product, can be an exciting event for the OEM product team. In conjunction with a product launch, a good product story (e.g., product brief or release notes) provides multi-faceted value across marketing, technical support, and other OEM teams/individuals, and boosts customer engagement. Thus, it is important to ensure that the product story is written and published in a timely manner.

Various roles in the product team contribute to the launch of a product or its features. The existing content generation process can be tedious, time consuming and often dependent on knowledge experts. Authoring ownership, collaboration, handoffs, and reviews across multiple contributors are just a few of the steps to arrive at a product story that generates value. On average, in the OEM scenario for example, the existing content generation process can take up to two weeks, potentially impacting timely delivery of the product story. Given the multiple parties handling the content through the various steps, the chance of losing some important content is high.

SUMMARY

Embodiments provide techniques for automated content generation in a computing environment.

For example, according to one illustrative embodiment, a method comprises managing one or more pipelines respectively corresponding to one or more item lifecycle stages. Each pipeline of the one or more pipelines comprises a set of data processing elements configured to execute a set of operations associated with a corresponding one of the item lifecycle stages. At least a portion of the set of operations executed in each pipeline comprise one or more content generation operations configured to generate a content fragment to automatically document the corresponding item lifecycle stage. The method then builds a document from at least a portion of content fragments generated by the one or more pipelines.

In some illustrative embodiments, the one or more item lifecycle stages may correspond to one or more stages associated with a lifecycle of a product associated with a given enterprise and may comprise one or more of a product ideating stage, a product designing stage, a product developing stage, a product testing stage, and a product marketing stage.

In some illustrative embodiments, the product may comprise a software product and the document built from the content fragments generated by the one or more pipelines may comprise a product description that documents information relating to the one or more lifecycle stages of the software product.

In some illustrative embodiments, at least one of the one or more pipelines may further comprise a set of data processing elements configured to execute a set of operations associated with generating code that is to be a part of the software product.

In some illustrative embodiments, the at least one pipeline of the one or more pipelines comprising a set of data processing elements configured to execute a set of operations associated with generating code that is to be a part of the software product may further comprise an extraction operation configured to extract information associated with at least one of developing and testing of the code, and wherein the extracted information is provided to the one or more content generation operations.

Further illustrative embodiments are provided in the form of a non-transitory computer-readable storage medium having embodied therein executable program code that when executed by a processor causes the processor to perform the above steps. Additional illustrative embodiments comprise an apparatus with a processor and a memory configured to perform the above steps.

Advantageously, illustrative embodiments provide a methodology for content generation in accordance with a distributed continuous integration, continuous documentation and continuous deployment system.

These and other features and advantages of embodiments described herein will become more apparent from the accompanying drawings and the following detailed description.

BRIEF DESCRIPTION OF THE DRAWINGS

FIGS. 3A through 3C illustrate examples of document fragments created by a distributed continuous integration, continuous documentation and continuous deployment system according to an illustrative embodiment.

FIG. 9 illustrates a processing platform for an information processing system used to implement a distributed continuous integration, continuous documentation and continuous deployment system according to an illustrative embodiment.

DETAILED DESCRIPTION

Figure 1:
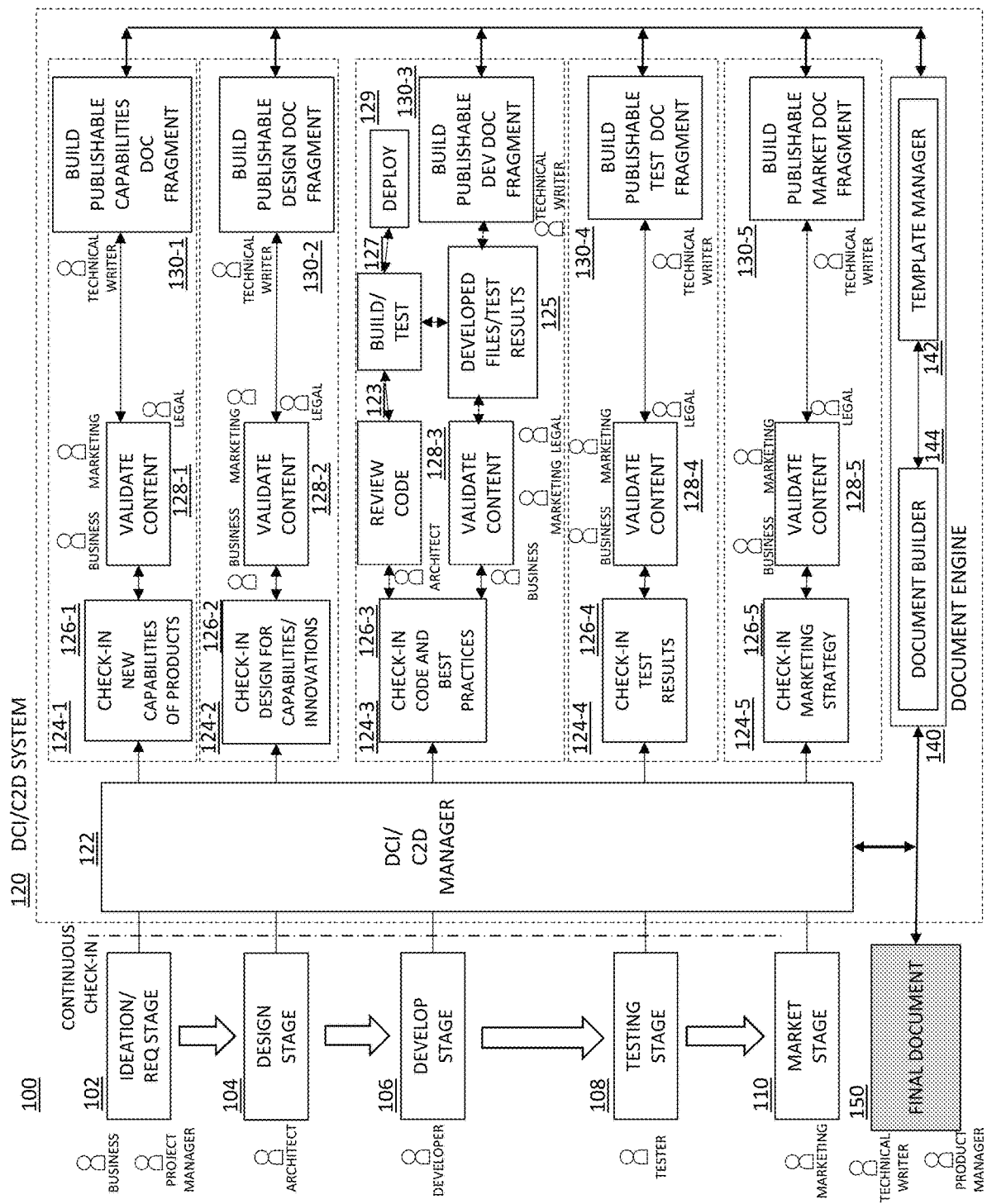
FIG. 1 illustrates a distributed continuous integration, continuous documentation and continuous deployment system in a computing environment according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

It is to be appreciated that automated content generation in accordance with illustrative embodiments will be described below in the context of a product story or product brief (i.e., the technical content or otherwise, simply, content) associated with the deployment of a software package (i.e., the product) developed by a given organization. However, automated content generation embodiments are not intended to be limited to a product story scenario and can be applied more generally to any content generation scenario for any item and purpose, i.e., beyond product development for software code.

It is realized herein that organizations struggle to create and articulate compelling, impactful, and timely product stories across the product's entire lifecycle. Product stories can connect with customers and completely shift their relationship not only with the product, but with the brand itself. A well-written product story illustrates a product's features by way of its benefits, telling a story of how that product will impact customers. A product story is critical because it will be used across the entire company and will likely be seen by many different people/groups, e.g., executive teams will review the product story to develop a value proposition, marketing teams will develop sales materials and messaging based off the product story, and sales teams will utilize the product story to identify ideal customer profiles and prospects. Developing a concise and thorough product story strengthens the efficiency and clarity of teams across the board. While the product story helps prevent unexpected outcomes as a new product is developed and brought to market, it is also a living document that should invite collaboration and discussion as the product team explores new ideas, e.g., improvements to the product.

In an organization, several roles, such as, but not limited to, product management, product marketing, engineering, architect, etc., are each unique to every organization and are needed to collaborate to build on a product story and make it accessible to intended users. Existing collaboration across organizational roles is often bulky, repeatability gets challenging and achieving intended outcomes is time consuming. Accuracy and leakage of information with handoffs across roles, and dependency in many cases on experts/knowledge, are key challenges in this process.

To develop a compelling and encompassing product story, as mentioned above, the lifecycle of the product development (stages) should be covered. A product story should include key information about the user story, business case (e.g., impact on the bottom line), technical specifications, and other critical details. Ideally, the product story should be the result of a collaborative effort, to make sure that all aspects of product development have been accurately sketched out. A well-crafted product story eliminates presumptions and avoids misinterpretations.

It is further realized herein that the role (individual or team) that is responsible for developing the product story should traverse through and collaborate across the various stages interviewing experts/personas in each of the stages of the lifecycle. With existing approaches, this collaborative process can be time consuming, bulky, risk potential information leakage, and be non-repeatable in nature.

For example, individuals and teams involved in different lifecycle stages need to coordinate with one or more technical writers and the product manager for generation of a product story. These stages can include, but are not limited to: (i) ideation/requirement stage where idea generation occurs and solutions to problems are brainstormed, qualified, screened, and vetted; (ii) design/architecture stage where analysis, research and preferred solutions are formed; (iii) development/implementation stage where detailed designs and potential future improvements are formed; (iv) testing stage where product quality testing occurs; and (v) marketing stage where market strategies for the new product are formed. Other stages and/or roles in the product lifecycle may include, but are not limited to, product release where launch of the product, training, and reporting occur, as well as legal where it is verified that content is legal for internal and external publishing.

Often, product story outcomes and obtainability depend on accessibility of experts across the above stages for collaboration. Also, the product story on a release could be different for internal versus external consumption. Thus, existing approaches tend to lead to rushed content generation which can result in loss of important content and otherwise a low quality document.

Illustrative embodiments overcome the above and other technical issues with existing product story creation by providing a distributed continuous integration, continuous documentation and continuous deployment (also referred to herein as DCI/C2D) process and architecture for automatically creating content such as, but not limited to, product stories/briefs. Such a DCI/C2D process and architecture utilizes a continuous integration and continuous deployment (CI/CD) pipeline approach to integrate continuous documentation in an automated manner resulting in improved content generation.

A CI/CD pipeline is a series of steps that are executed in order to deliver a new version of software. More particularly, the CI/CD pipeline is a computer-executed process that drives automated development of the software through a path of building, testing, and deploying code. More generally, a pipeline is a set of data processing elements connected in series, where the output of one element is the input of the next one. The elements of a pipeline can be executed in parallel or in time-sliced fashion.

By adding in documentation functionalities to this automated process in illustrative DCI/C2D embodiments, document generation is advantageously integrated with the software development and deployment process. In some illustrative embodiments, for example, wherein the computing environment is a distributed environment, a pipeline architecture can be implemented using container images deployed across one or more cloud platforms. However, embodiments are not limited to cloud platforms and, in some embodiments, are implemented in one or more non-cloud processing platforms. Note also that while the documentation functionalities are automated, the DCI/C2D process and architecture enable user participation in the operations depending on the user's role in the code and/or content generation environment, as will be illustrated in further detail herein.

Furthermore, the DCI/C2D process and architecture enables different teams to continuously integrate their content and/or code in distributed CI/CD pipelines automatically and dynamically managed by a DCI/C2D manager. The DCI/C2D process and architecture intelligently integrates across the distributed pipelines and, inter alia, builds different document fragments (more generally referred to herein as content fragments). The document fragments are continuously verified and approved by teams such as, by way of example, marketing and legal users. By the end of the product development cycle, as will be further described herein, the product manager and technical writer(s) can publish the final product story simply by issuing a publish command (e.g., clicking an automated publish button) to a document engine configured to electronically release the content.

Turning initially to FIG. 1, a distributed continuous integration, continuous documentation and continuous deployment (DCI/C2D) system is illustrated in a computing environment 100 according to an illustrative embodiment. As shown, the pipeline architecture of a DCI/C2D system 120 corresponds to lifecycle stages (more simply, stages) associated with a product development and deployment process. More particularly, as shown, the stages comprise an ideation/req (requirement) stage 102, a design stage 104, a develop (development or dev) stage 106, a testing stage 108, and a market (marketing) stage 110. More or less stages can be included in alternative embodiments. Stages 102 through 110 are operatively coupled to a DCI/C2D manager 122 and correspond to a plurality of pipelines 124-1, 124-2, 124-3, 124-4, and 124-5, respectively (referred to herein collectively as pipelines 124 and individually as pipeline 124).

Each stage 102 through 110 performs a continuous check-in operation through DCI/C2D manager 122 with its corresponding pipeline 124. As illustratively used herein, the term "check-in" refers to an operation that enables users to integrate content and/or code into a shared repository multiple times a day. Each check-in is then verified by an automated build, enabling early detection of problems, as described herein. As illustrated in FIG. 1, multiple users are shown having various roles, e.g., business, project manager, architect, developer, tester, marketing, technical writer, and legal. These roles and how they relate to various steps and stages will be further explained throughout the illustrative descriptions below.

As further shown, each pipeline 124 comprises: a check-in module, i.e., 126-1 for ideation/req stage 102, 126-2 for design stage 104, 126-3 for develop stage 106, 126-4 for testing stage 108, and 126-5 for market stage 110 (referred to herein collectively as check-in modules 126 and individually as check-in module 126); a content validation module, i.e., 128-1 for ideation/req stage 102, 128-2 for design stage 104, 128-3 for develop stage 106, 128-4 for testing stage 108, and 128-5 for market stage 110 (referred to herein collectively as content validation modules 128 and individually as content validation module 128); and a build publishable document (doc) fragment module, i.e., 130-1 for ideation/req stage 102, 130-2 for design stage 104, 130-3 for develop stage 106, 130-4 for testing stage 108, and 130-5 for market stage 110 (referred to herein collectively as build publishable doc fragment modules 130 and individually as build publishable doc fragment module 130). In general, the check-in module 126 in each pipeline 124 performs the above-mentioned check-in operation for product story content received for each stage and user role. Each check-in is then validated (verified) by content validation module 128 and an automated build for the document fragment for that stage is performed by build publishable document fragment module 130. This continuous check-in, validate, and build sequence of automated operations for each document fragment for each stage of the product development lifecycle enables detection of any problems early in the content (product story) generation process.

Note also that the pipeline 124 (124-3) associated with develop stage 106 also comprises a review code module 123, a developed files/test results module 125, a build/test module 127, and a deploy module 129. Modules 123, 125, 127, and 129 perform steps similar to typical CI/CD pipeline steps for the development and deployment of a software product. That is, the developer checks in code developed over a given time period which, along with test results, is reviewed, and the code is deployed in a system environment for which it is designed. However, unlike existing CI/CD pipelines, pipeline 124-3 advantageously also integrates document fragment generation functionality (as in pipelines 124 for the other stages) along with the software product code intake to enable accurate and timely content generation for the product story.

Each document fragment built in each build publishable doc fragment module 130 of each pipeline 124 is then provided to a document engine 140 which comprises a template manager 142 and a document builder 144. In general, template manager 142 selects the appropriate final document format for the product story, and document builder populates the selected template with the document fragments from each pipeline 124 (stage). This may also be illustratively referred to herein as assembling the document from the document fragments. The document engine 140 then outputs the product story as a final document 150.

Figure 2:
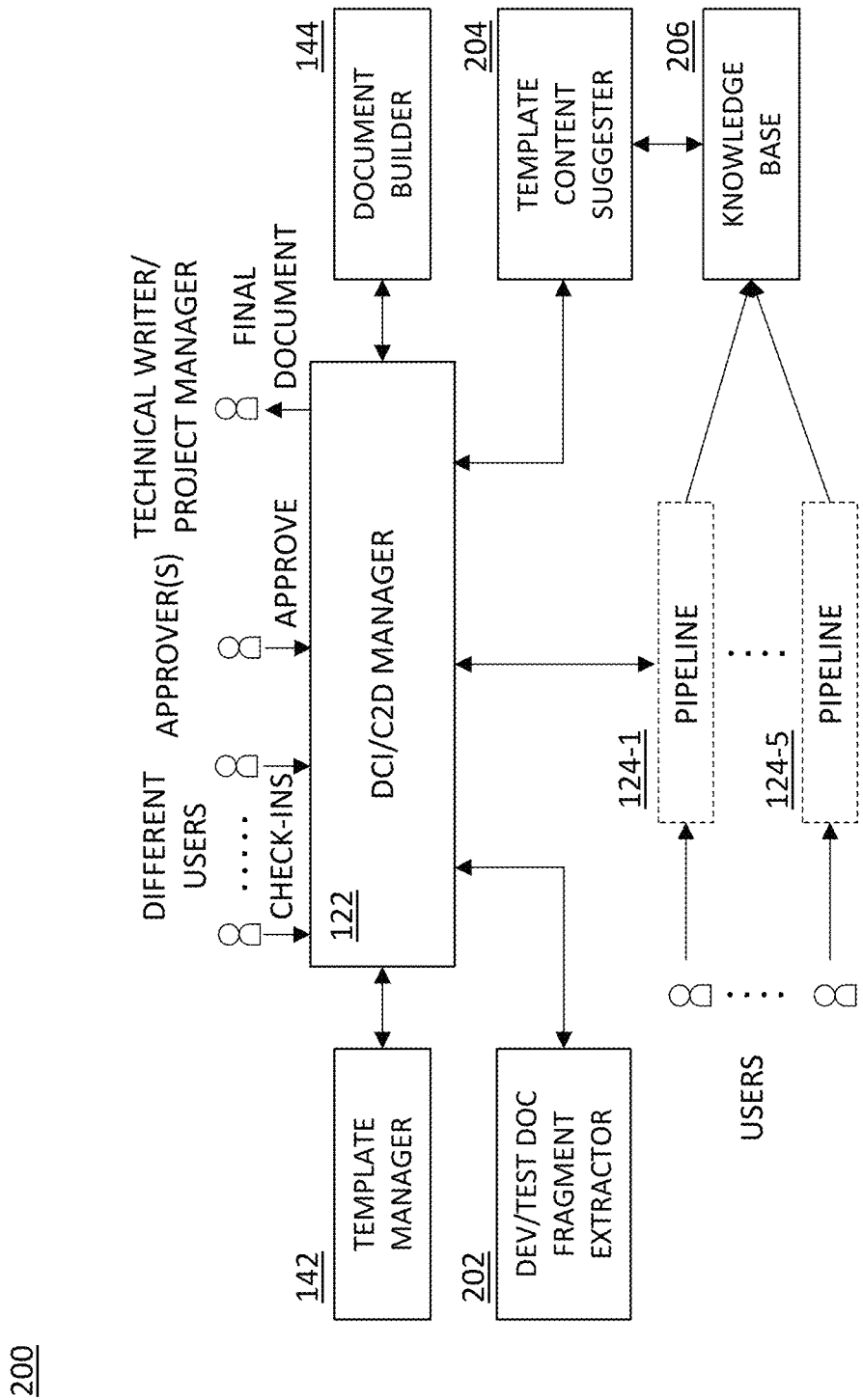
FIG. 2 illustrates further details of a distributed continuous integration, continuous documentation and continuous deployment manager according to an illustrative embodiment.

FIG. 2 illustrates further details 200 of DCI/C2D system 120 according to an illustrative embodiment. More particularly, as shown, DCI/C2D manager 122 is shown operatively coupled to pipelines 124, template manager 142 and document builder 144. A dev/test document fragment extractor module 202 and template content suggester module 204 are also operatively coupled to DCI/C2D manager 122. A knowledge base module 206 is operatively coupled to outputs of pipelines 124 as well as to template content suggester module 204.

As mentioned, DCI/C2D manager 122 manages and coordinates the distributed continuous integration, continuous documentation and continuous deployment processes as described herein. Further, each pipeline 124 produces one or more document fragments based on a selected template. Dev/test document fragment extractor module 202 extracts information from the files checked in and for which test are conducted. Template manager 142 manages a plurality of selectable templates, e.g., a different template for different product releases. Document builder 144 is configured to build (assemble) the final document (product story) for different formats. Knowledge base module 206 collects output from pipelines, and template content suggester module 204 facilitates users and the system to choose suitable content, templates, and target document formats based on historical product story creation stored in knowledge base module 206.

As illustratively used herein, the term "document fragment" or "doc fragment" (more generally, content fragment) is the representation of content in a specific section of a document standard such as the JavaScript Object Notation (Json) representation. The Json representation contains: (i) document styes; (ii) text; and (iii) a HyperText Markup Language (HTML) tag representation. Assume an example product story for an OEM product that provides customer managed infrastructure that enables consistent, secure operations with automation and orchestration across private and public cloud for virtual workloads, e.g., Flex on Demand for Dell APEX. Further assume that the product manager wants the introduction to the product story to read as the text 300 shown in FIG. 3A.

For this example, the document template has the following HTML representation:

<H "color": "grey","font size":"20px"></H>
<Text></Text>

Figure 3A:
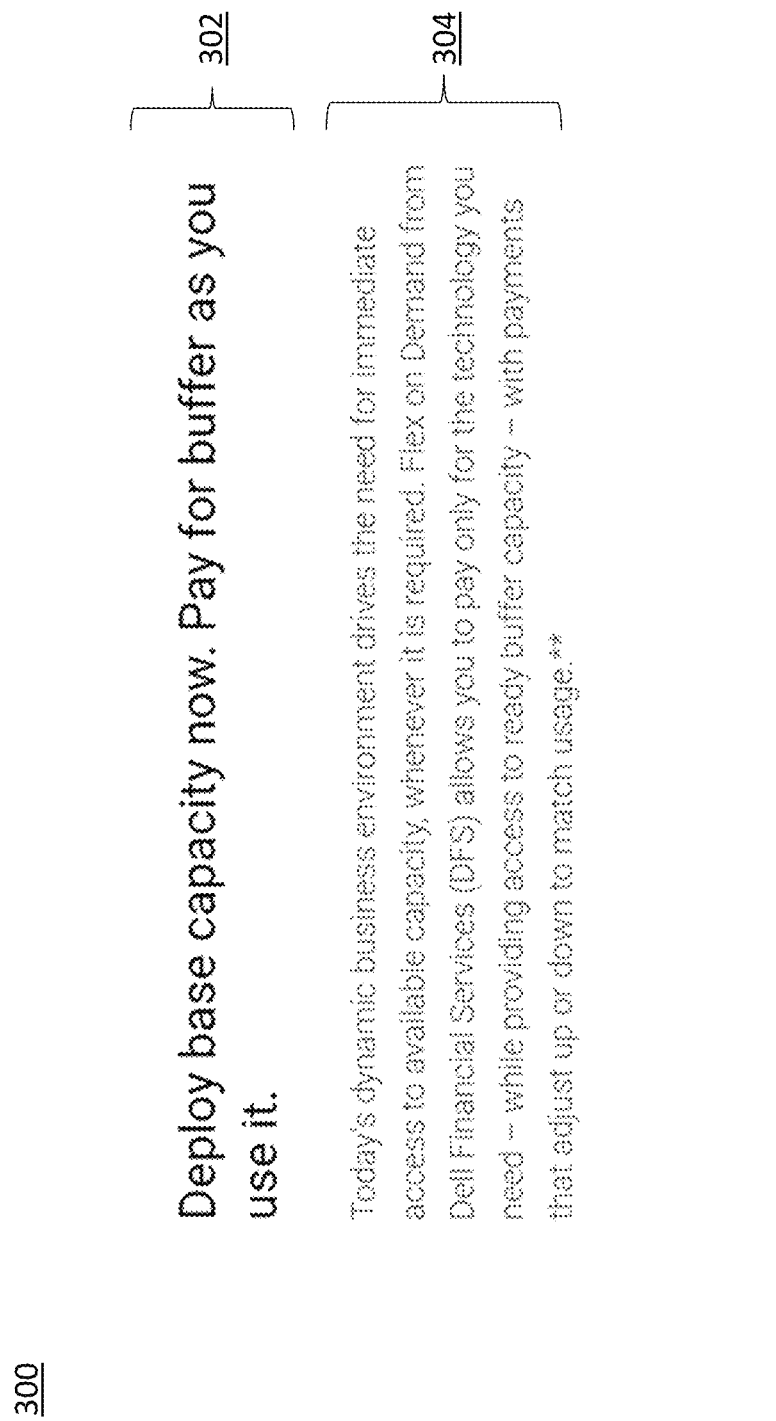
Figure 3B:
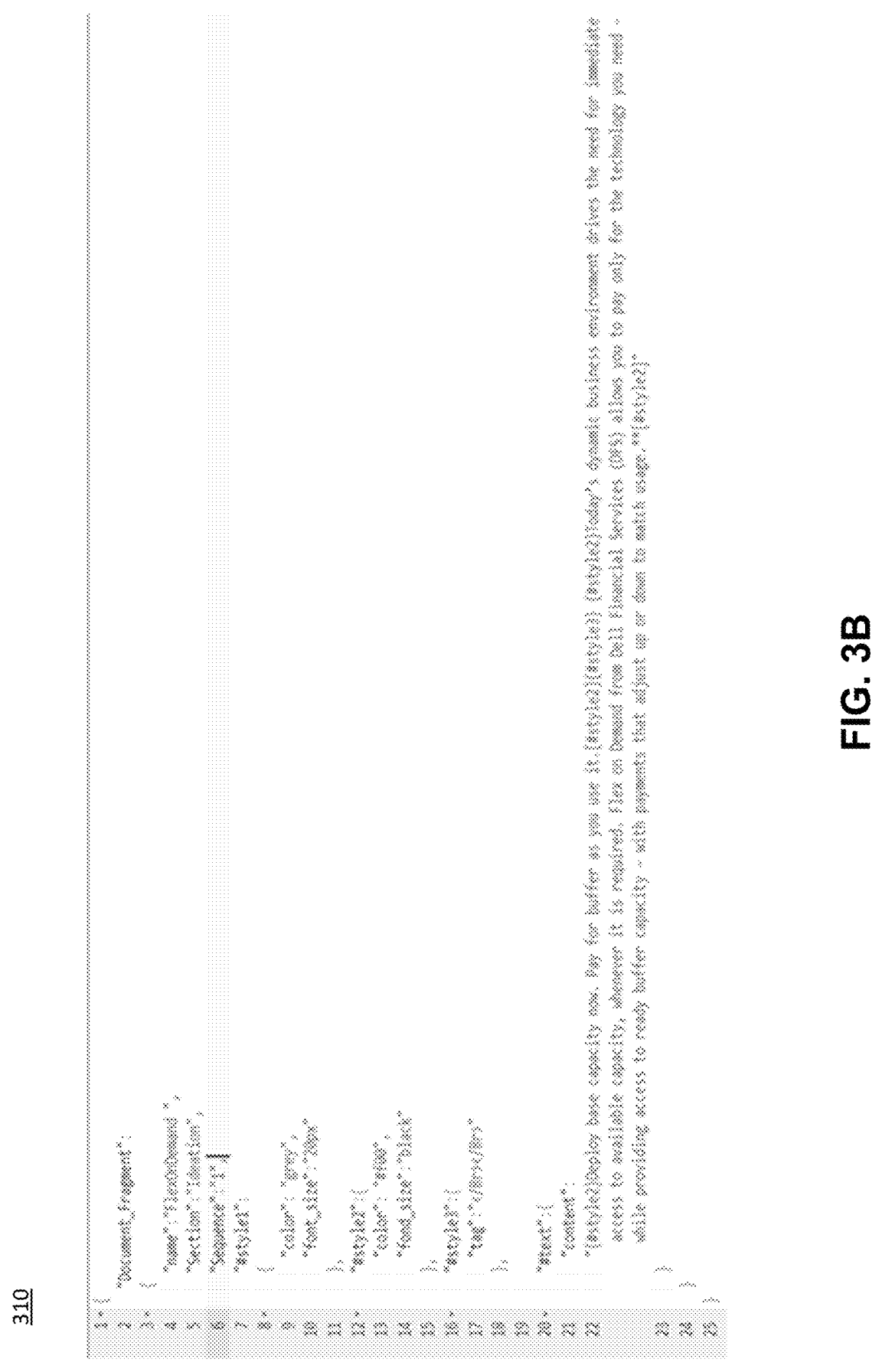

DCI/C2D manager 122 is instructed that that the selected template has two parts, a header and a body, and the system needs to obtain text for both. Once the user provides the text, the system creates the document fragment with the selected template style, i.e., a header 302 and a body 304 as shown in FIG. 3A. However, it is to be understood that the user can override the automatically suggested style and identify any alternative template or format. FIG. 3B illustrates code 310 that can be executed to generate the document fragment shown in FIG. 3A.

Further, document fragments as a Json representations of text, data, and images, with all styles to be applied, can be created in the following illustrative document fragment creation processes:

(i) With document template and text: based on the document template, a user is prompted to add the text, and a two-part document fragment is created (as shown in FIG. 3B).

(ii) From a TFS query and Json template: a user can give the TFS query and based on the query result and Json template, the document fragment is created. Note that TFS stands for Team Foundation Server which is a set of collaborative software development tools. FIG. 3C illustrates an example of code 320 used to create a document fragment in this TFS query manner. Instead of #text, it will be #query and a connection string is configured in DCI/C2D manager 122 with a password in a vault. When building the document, the query is executed on the connection string and text is updated.

(iii) Change set, unit testcase result and Json template: a user selects the change set query and unit testcase result and template.

(iv) The user can upload a formatted DOC (MS Word) file. In this case, the document fragment will include the uniform resource locator (URL) to the document uploaded in DCI/C2D manager 122.

In all the above methods, the input is converted into document fragments in the common format (e.g., Json structure). More particularly, as mentioned above, these document fragments are created in each distributed DCI/C2D pipeline 124. The document fragments are then fed into document builder 144 to create final document 150.

Figure 4:
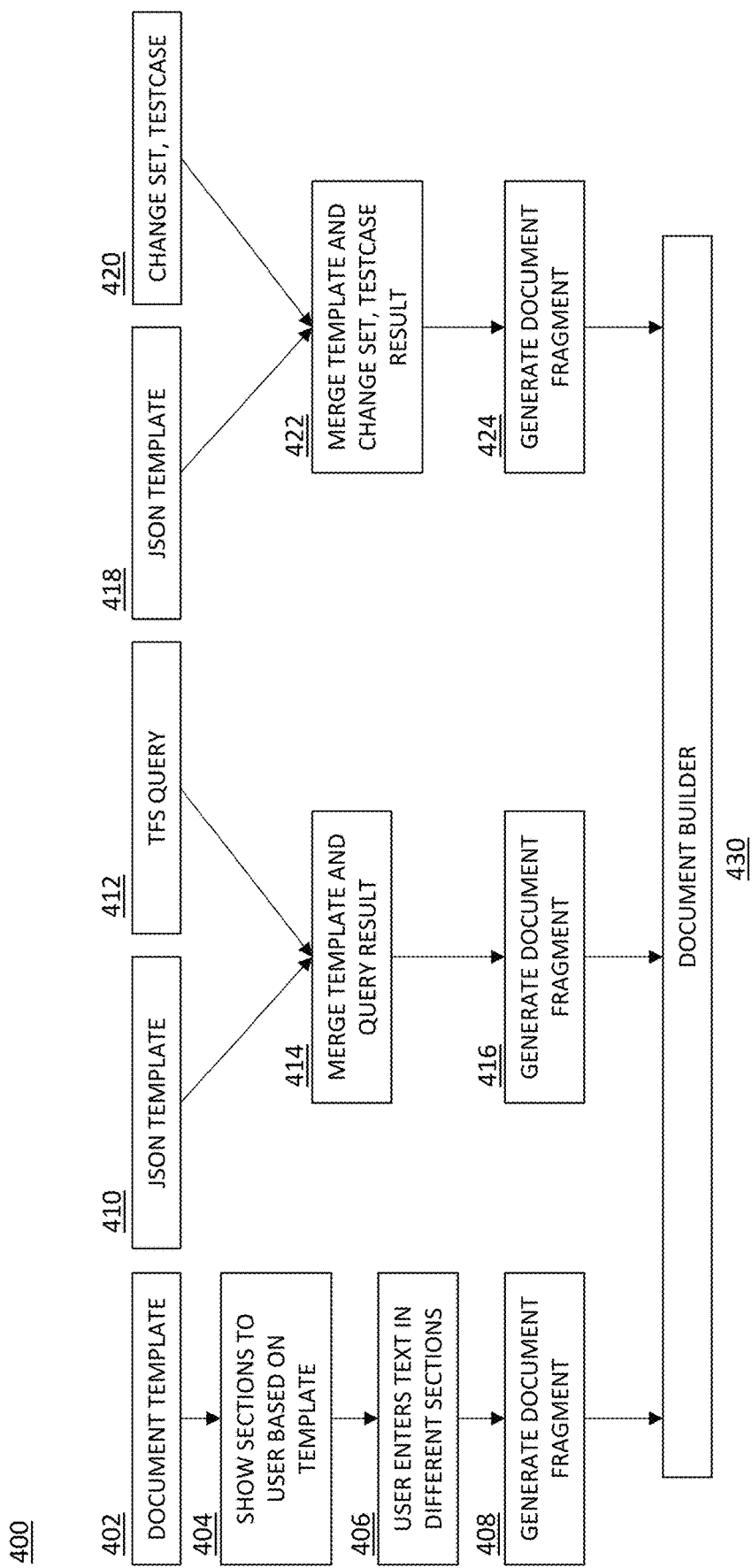
FIG. 4 illustrates a content generation process according to an illustrative embodiment.

FIG. 4 illustrates a content generation process 400 using some of the above document fragment creation processes. As mentioned, two or more of the above document fragment creation processes can be implemented within the same pipeline 124 or different pipelines 124.

For example, as shown, steps 402 though 408 illustrate document fragment creation process (i) wherein a document template is selected in step 402, and sections are identified for the user based on selected template in step 404. The user enters text, data, and/or one or more images in the different sections in step 406, and the document fragment is generated in step 408. Note that the process depends on the stage involved and the corresponding pipeline (recall the various stages, pipelines, and roles described above in the context of FIG. 1).

Steps 410 through 416 illustrate document fragment creation process (ii) wherein a Json template is selected in step 410 and a TFS query is obtained in step 412. Step 414 merges the template and query result, and the document fragment is generated in step 416. Note that the process depends on the stage involved and the corresponding pipeline (recall the various stages, pipelines, and roles described above in the context of FIG. 1).

Steps 418 through 424 illustrate document fragment creation process (iii) wherein a Json template is selected in step 418 and a change set and testcase are obtained in step 420. Step 422 merges the template and change set, testcase result, and the document fragment is generated in step 424. Note that the process depends on the stage involved and the corresponding pipeline (recall the various stages, pipelines, and roles described above in the context of FIG. 1).

Each of the resulting document fragments from steps 408, 416, and 424 are assembled by document builder 144 in step 430 to form the final document 150.

It is to be appreciated that any stage 102 through 110 can have multiple pipelines 124.

Figure 5:
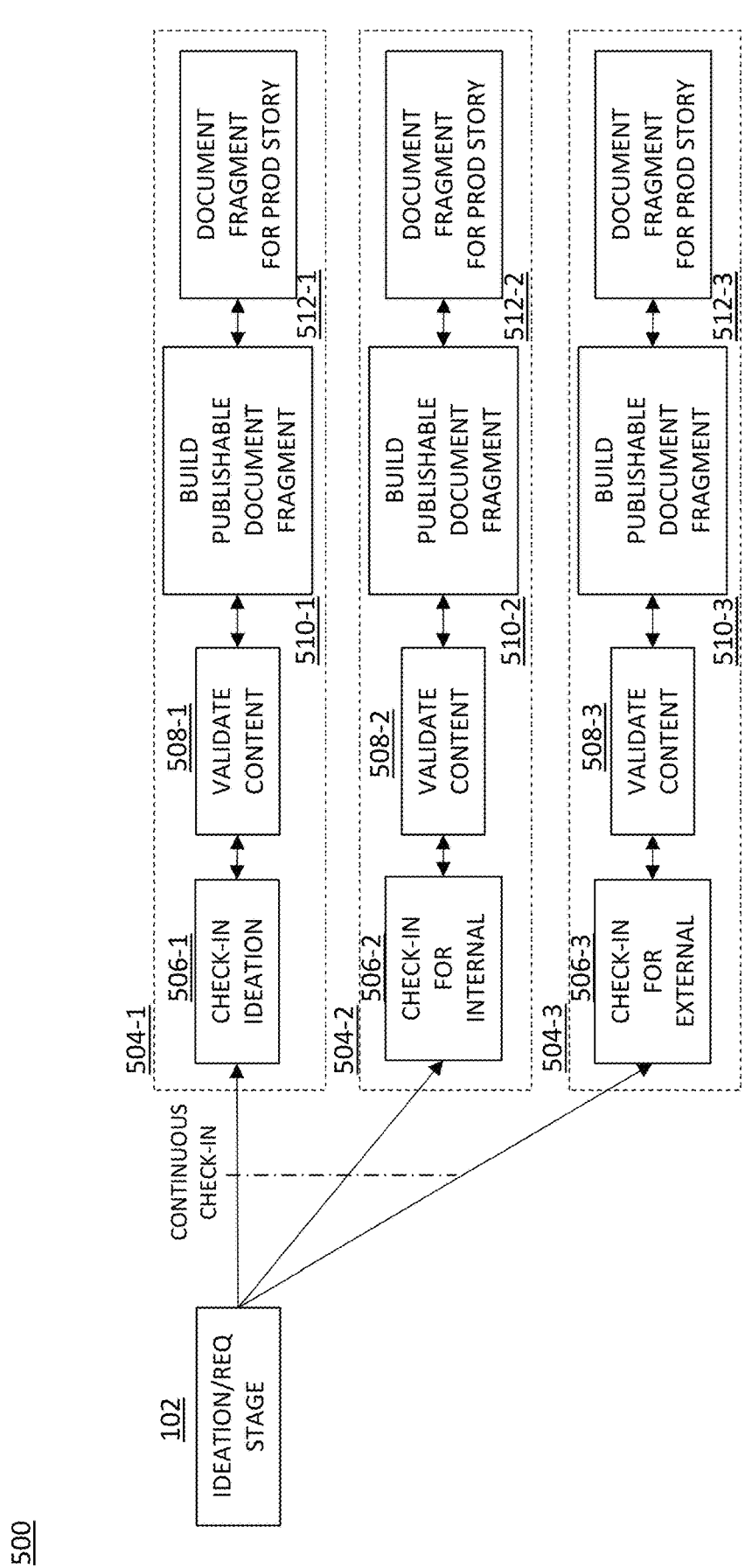
FIG. 5 illustrates multiple pipelines associated with a product ideation stage of a content generation process according to an illustrative embodiment.

For example, FIG. 5 shows product ideation/req stage 102 with a multiple pipeline architecture 500 comprising multiple pipelines 504-1, 504-2, and 504-3 (referred to herein collectively as pipelines 504 and individually as pipelines 504). While not expressly shown, it is to be understood that the pipelines 504 and the automated steps therein are managed by DCI/C2D manager 122 as described herein.

As further shown, each pipeline 504 comprises: a check-in module, i.e., 506-1 for ideation pipeline 504-1, 506-2 for internal content pipeline 504-2, and 506-3 for external content pipeline 504-3 (referred to herein collectively as check-in modules 506 and individually as check-in module 506); a content validation module, i.e., 508-1 for ideation pipeline 504-1, 508-2 for internal content pipeline 504-2, and 508-3 for external content pipeline 504-3 (referred to herein collectively as content validation modules 508 and individually as content validation module 508); a build publishable document fragment module, i.e., 510-1 for ideation pipeline 504-1, 510-2 for internal content pipeline 504-2, and 510-3 for external content pipeline 504-3 (referred to herein collectively as build publishable document fragment modules 510 and individually as build publishable document fragment module 510); and a document fragment for prod (product) story, i.e., 512-1 for ideation pipeline 504-1, 512-2 for internal content pipeline 504-2, and 512-3 for external content pipeline 504-3 (referred to herein collectively as document fragments 512 and individually as document fragment 512).

The pipeline stage illustrated in FIG. 5 is set up for the ideator/business/product manager. These users check in the idea and requirements in a given template for internal and external use. Users can mark a template for both internal and external use. For the requirements, the product manager can give the access URL for the tool (TFS/Jira) the product manager is using with proper query parameters. The DCI/C2D manager 122 either builds the document fragment from the tool or builds it from what the product manager entered. The pipelines 504 enable the business user, marketing user, and legal user to validate the content. Legal can reject and ask for a change, and DCI/C2D manager 122 notifies the authors with the needed changes. Once the content is satisfactory, document builder 144 builds the document from the document fragments. The pipeline 504 acknowledges the technical writer and he/she can update and get approval from the author and keep the fragments ready.

Once the ideation document fragment is created, a notification goes to a design stage user (architect) to add the design document fragment, as well as best practices and innovations used in the design project. The architect adds the relevant details adhering to the document standard defined for the design pipeline 124 for internal and external use (similar to the ideation/req stage, the design stage can have multiple pipelines). Once checked-in, the notification goes to the business, marketing, and legal users to verify/validate, who can also ask for corrections in previously generated content.

Figure 6:
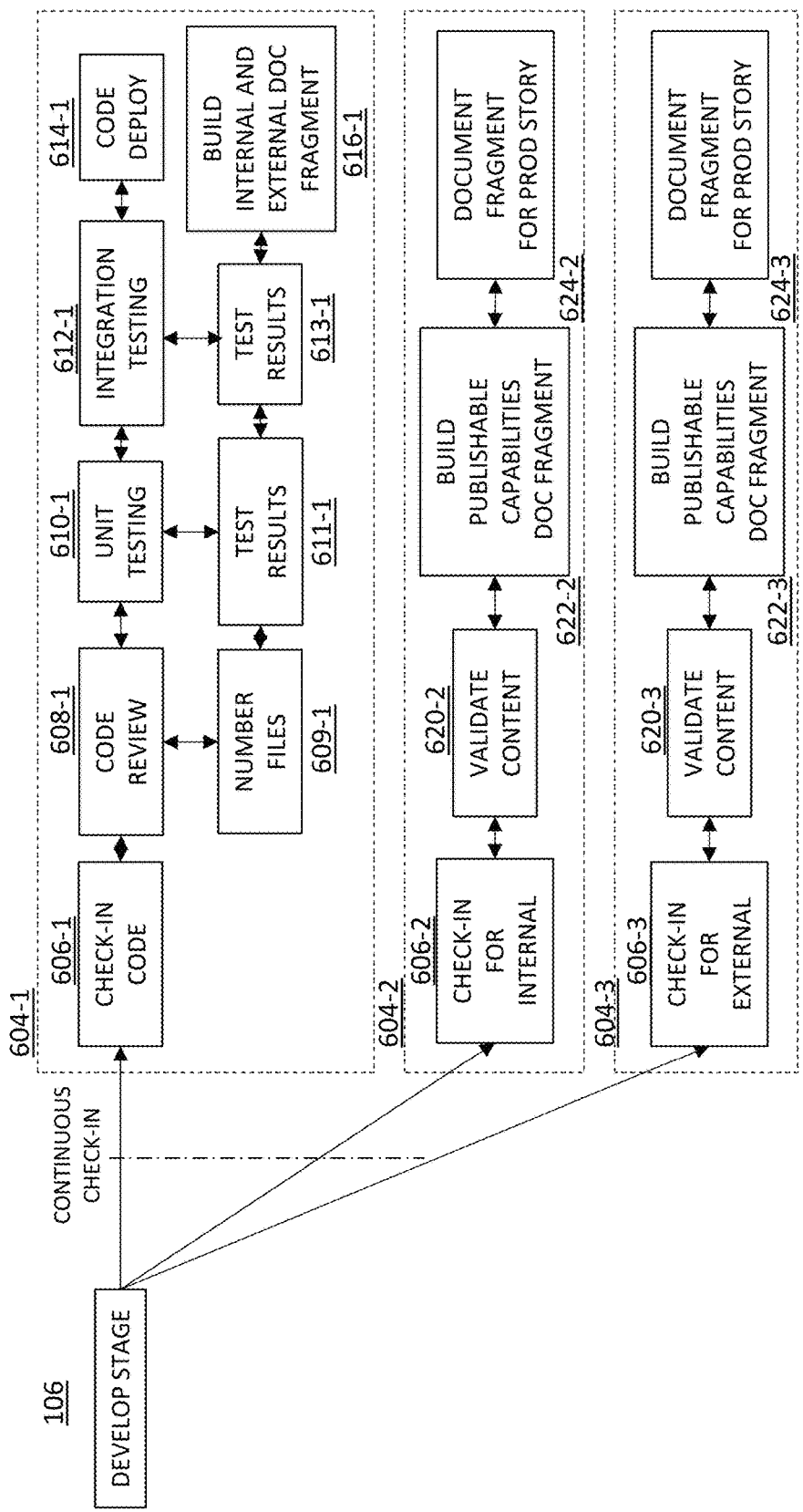
FIG. 6 illustrates multiple pipelines associated with a product development stage of a content generation process according to an illustrative embodiment.

FIG. 6 illustrates product development (develop) stage 106 with a multiple pipeline architecture 600 comprising multiple pipelines 604-1, 604-2, and 604-3 (referred to herein collectively as pipelines 604 and individually as pipelines 604). Again, while not expressly shown, it is to be understood that the pipelines 604 and the automated steps therein are managed by DCI/C2D manager 122 as described herein.

As mentioned, the develop stage 106 also uses CI/CD functionalities for developing the code associated with the software for which the product story is being written. As shown in pipeline 604-1, this includes a code check-in module 606-1, a code review module 608-1 with a number of files 609-1, a unit testing module 610-1 with test results 611-1, an integration testing module 612-1 with test results 613-1, a code deploy module 614-1, and a build internal and external document (doc) fragment module 616-1. Pipeline 604-1 extracts the number of files (609-1) checked in, continuously performs unit (610-1) and integration (612-1) testing to obtain test results (611-1 and 613-1).

Pipeline 604-2 represents the internal document fragment generator for the develop stage 106, while pipeline 604-3 represents the external document fragment generator for the develop stage 106. Pipelines 604-2 and 604-3 each comprise a content validation module, i.e., 620-2 for internal content pipeline 604-2, and 620-3 for external content pipeline 604-3 (referred to herein collectively as content validation modules 620 and individually as content validation module 620); a build publishable capabilities document (doc) fragment module, i.e., 622-2 for internal content pipeline 604-2, and 622-3 for external content pipeline 604-3 (referred to herein collectively as build publishable capabilities document fragment modules 622 and individually as build publishable capabilities document fragment module 622); and a document fragment for prod (product) story, i.e., 624-2 for internal content pipeline 604-2, and 624-3 for external content pipeline 604-3 (referred to herein collectively as document fragments 624 and individually as document fragment 624).

The test results 611-1 and 613-1 are used to automatically build the internal and external document fragments (616-1). Once built, the technical writer is notified who creates a document for internal and external usage. Once checked back in, the system notifies legal for the external document fragment. Once approved, the final internal and external document fragments are built. The development stage lead can also check the additional best practices, innovations, etc., which will go to architect for approval for internal and external usage.

Testing stage 108 comprises a similar pipeline architecture as the develop stage (FIG. 6). In some illustrative embodiments, testing results are stored in a TFS/Jira/SharePoint environment. The DCI/C2D manager 122 pulls the information from the TFS/Jira/SharePoint environment and creates the document. Testing developers are also allowed to check in the test results and best practices. The technical writer views the results and initiates building of the internal and external document fragments. External document fragments are approved by legal, business, and marketing users. Similarly, the market stage 110 uses one or more pipelines to create the document based on the standard structure which, when for external usage, gets approved by legal.

Once all pipelines are approved, notification is sent to the product manager and technical writer who create the template for the product story or use the existing one. Once the template is created/selected, the user issues a build command. DCI/C2D manager 122 can use existing document building technology to build the internal and external documents. Again, external documents are reviewed and approved by marketing and legal, and any changes can be done by the product manager/technical writer and re-checked in.

Figure 7:
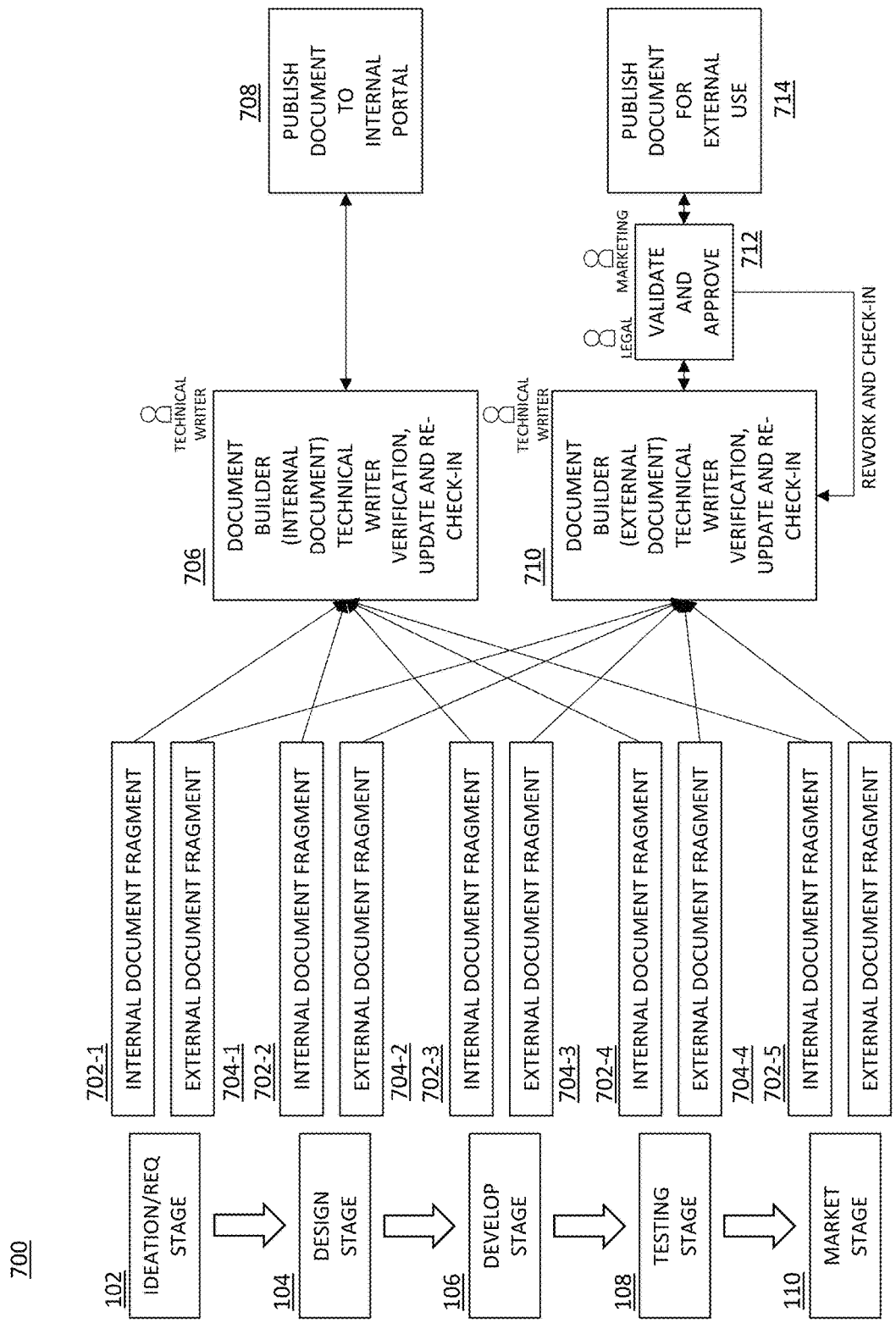
FIG. 7 illustrates a content generation process with internal and external document builds according to an illustrative embodiment.

This is summarized in FIG. 7 which shows a content generation process 700 with internal and external document builds. As shown, for each stage 102 through 110, an internal document fragment (702-1, 702-2, 702-3, 702-4, and 702-5, collectively/individually referred to as 702) and an external document fragment (704-1, 704-2, 704-3, 704-4, and 704-5, collectively/individually referred to as 704). Internal document fragments 702 are sent to a document builder module 706 for technical writer verification, update and re-check-in. The final internal document is published to an internal portal 708. External document fragments 704 are sent to a document builder module 710 for technical writer verification, update and re-check-in, then to a validate and approve module 712 for marketing and legal to authorize. The final external document is published for external use 714.

Advantageously, as explained herein, illustrative embodiments provide a process for creating a product story using DCI/DC2D paradigm. A DCI/C2D manager coordinates between various distributed CI/CD type pipelines. A document fragment concept is used in a standard Json format. Illustrative embodiments also provide for automatic extraction of development and testing details for the product story from the existing CI/CD pipeline. Further, document creation occurs from the document fragments. Still further, information is extracted from the development pipeline for building a development document fragment, and similarly, information is extracted from a testing repository for building a testing document fragment.

Figure 8:
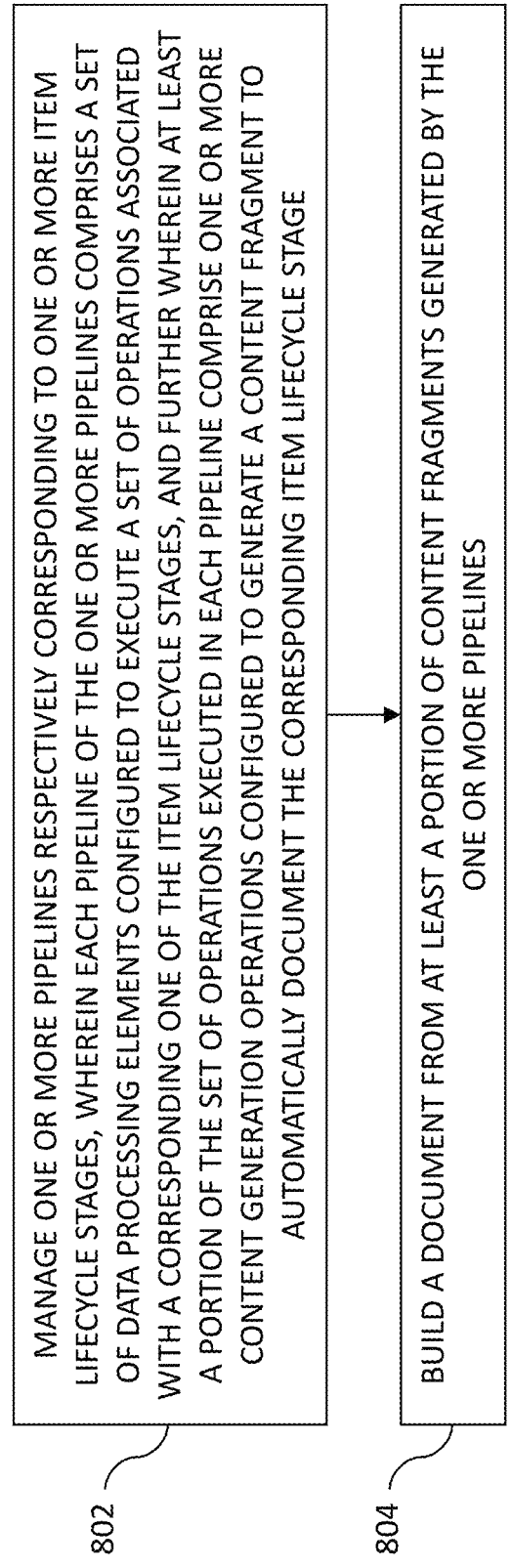
FIG. 8 illustrates a methodology for content generation in accordance with a distributed continuous integration, continuous documentation and continuous deployment system according to an illustrative embodiment.

FIG. 8 illustrates a methodology for content generation 800 in accordance with a distributed continuous integration, continuous documentation and continuous deployment system according to an illustrative embodiment.

Step 802 manages one or more pipelines respectively corresponding to one or more item lifecycle stages. Each pipeline of the one or more pipelines comprises a set of data processing elements configured to execute a set of operations associated with a corresponding one of the item lifecycle stages. At least a portion of the set of operations executed in each pipeline comprise one or more content generation operations configured to generate a content fragment to automatically document the corresponding item lifecycle stage.

Step 804 builds a document from at least a portion of content fragments generated by the one or more pipelines.

In some illustrative embodiments, the one or more item lifecycle stages may correspond to one or more lifecycle stages associated with a lifecycle of a product (more generally, item) associated with a given enterprise and may comprise one or more of a product ideating stage, a product designing stage, a product developing stage, a product testing stage, a product marketing stage.

In some illustrative embodiments, the product may comprise a software product and the document built from the content fragments generated by the one or more pipelines may comprise a product description that documents information relating to the one or more lifecycle stages of the software product.

In some illustrative embodiments, at least one of the one or more pipelines may further comprise a set of data processing elements configured to execute a set of operations associated with generating code that is to be a part of the software product.

In some illustrative embodiments, the at least one pipeline of the one or more pipelines may further comprise a set of data processing elements configured to execute a set of operations associated with generating code that is to be a part of the software product further comprises an extraction operation configured to extract information associated with at least one of developing and testing of the code, and wherein the extracted information is provided to the one or more content generation operations.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

FIG. 9 illustrates a processing platform 900 used to implement environments/platforms/architectures/systems/processes/methodologies/data 100 through 800 depicted in FIGS. 1 through 8 respectively, according to an illustrative embodiment. More particularly, processing platform 900 is a processing platform on which a computing environment with functionalities described herein can be implemented.

The processing platform 900 in this embodiment comprises a plurality of processing devices, denoted 902-1, 902-2, 902-3, . . . 902-K, which communicate with one another over network(s) 904. It is to be appreciated that the methodologies described herein may be executed in one such processing device 902, or executed in a distributed manner across two or more such processing devices 902. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 902 shown in FIG. 9. The network(s) 904 represent one or more communications networks that enable components to communicate and to transfer data therebetween, as well as to perform other functionalities described herein.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random-access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1 through 8. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the networks 904 and other system components. Such circuitry may comprise conventional transceivers of a type well known in the art.

The other processing devices 902 (902-2, 902-3, . . . 902-K) of the processing platform 900 are assumed to be configured in a manner similar to that shown for computing processing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the system shown as 900 in FIG. 9 may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-9 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus, comprising:
a processing platform comprising at least one processor and at least one memory storing computer program instructions wherein, when the at least one processor executes the computer program instructions, the apparatus is configured to:
manage, with a management module, one or more pipelines operatively coupled to the management module, each of the one or more pipelines respectively corresponding to one or more item lifecycle stages, wherein each pipeline of the one or more pipelines comprises a set of data processing elements configured to execute a set of operations associated with a corresponding one of the one or more item lifecycle stages, and further wherein at least a portion of the set of operations executed in each pipeline comprise one or more content integration operations to integrate at least one of content and code into a shared repository, and one or more content generation operations configured to generate a content fragment to automatically document the corresponding item lifecycle stage, the content fragment generation comprising:
iteratively receiving the at least one of content and code from the one or more item lifecycle stages, and checking the received at least one of content and code into a corresponding pipeline of the one or more pipelines;
iteratively validating the at least one of content and code; and
generating the content fragment comprising a representation of the at least one of content and code in a standardize object notation format; and
generate a document from at least a portion of content fragments generated by the one or more pipelines, wherein the document is generated by:
selecting, with the management module, a document format; and
selecting, with the management module, one or more content fragments from each of the one or more pipelines to populate one or more portions of the document format;
wherein the document is generated for internal use, the document is verified, updated and re-integrated prior to being published to an information processing system coupled to the processing platform, and wherein the document is generated for external use, the document is verified, updated, re-integrated, validated and approved for external sharing prior to being published for use external to the information processing system.

2. The apparatus of claim 1, wherein the one or more content generation operations in each pipeline comprise one or more of a content check-in operation, a content validation operation, and a publishable content fragment generation operation.

3. The apparatus of claim 2, wherein the publishable content fragment generation operation comprises:
obtaining a template;
obtaining user-input text associated with the corresponding item lifecycle stage; and
creating the content fragment based on the template and the user-input text.

4. The apparatus of claim 2, wherein the publishable content fragment generation operation comprises:
obtaining a template;
obtaining a query configured to return text associated with the corresponding item lifecycle stage; and creating the content fragment based on the template and the query-returned text.

5. The apparatus of claim 4, wherein the template comprises a standardized object notation format.

6. The apparatus of claim 2, wherein the publishable content fragment generation operation comprises:
obtaining a user-formatted document; and
creating the content fragment based on the user-formatted document.

7. The apparatus of claim 2, wherein the content validation operation comprises:
enabling one or more users having one or more roles in a corresponding item lifecycle stage to verify content prior to the publishable content fragment generation operation.

8. The apparatus of claim 1, wherein the one or more item lifecycle stages correspond to one or more stages associated with a lifecycle of a product associated with a given enterprise and comprise one or more of a product ideating stage, a product designing stage, a product developing stage, a product testing stage, and a product marketing stage.

9. The apparatus of claim 8, wherein the product comprises a software product and the document generated from the content fragments generated by the one or more pipelines comprises a product description that documents information relating to the one or more lifecycle stages of the software product.

10. The apparatus of claim 9, wherein at least one pipeline of the one or more pipelines further comprises a set of data processing elements configured to execute a set of operations associated with generating code that is to be a part of the software product.

11. The apparatus of claim 10, wherein the at least one pipeline of the one or more pipelines comprising a set of data processing elements configured to execute a set of operations associated with generating code that is to be a part of the software product further comprises an extraction operation configured to extract information associated with at least one of developing and testing of the code, and wherein the extracted information is provided to the one or more content generation operations.

12. A method, comprising:
managing, with a management module, one or more pipelines operatively coupled to the management module, each of the one or more pipelines respectively corresponding to one or more item lifecycle stages, wherein each pipeline of the one or more pipelines comprises a set of data processing elements configured to execute a set of operations associated with a corresponding one of the one or more item lifecycle stages, and further wherein at least a portion of the set of operations executed in each pipeline comprise one or more content integration operations to integrate at least one of content and code into a shared repository, and one or more content generation operations configured to generate a content fragment to automatically document the corresponding item lifecycle stage, the content fragment generation comprising:
iteratively receiving the at least one of content and code from the one or more item lifecycle stages, and checking the received at least one of content and code into a corresponding pipeline of the one or more pipelines;
iteratively validating the at least one of content and code; and
generating the content fragment comprising a representation of the at least one of content and code in a standardize object notation format; and
generating a document from at least a portion of content fragments generated by the one or more pipelines, wherein the document is generated by:
selecting, with the management module, a document format; and
selecting, with the management module, one or more content fragments from each of the one or more pipelines to populate one or more portions of the document format;
wherein the document is generated for internal use, the document is verified, updated and re-integrated prior to being published to an information processing system coupled to a processing platform, and wherein the document is generated for external use, the document is verified, updated, re-integrated, validated and approved for external sharing prior to being published for use external to the information processing system; and
wherein the method is performed by the processing platform comprising at least one processor coupled to at least one memory executing program code.

13. The method of claim 12, wherein the one or more item lifecycle stages correspond to one or more stages associated with a lifecycle of a product associated with a given enterprise and comprise one or more of a product ideating stage, a product designing stage, a product developing stage, a product testing stage, a product marketing stage.

14. The method of claim 13, wherein the product comprises a software product and the document generated from the content fragments generated by the one or more pipelines comprises a product description that documents information relating to the one or more lifecycle stages of the software product.

15. The method of claim 14, wherein at least one pipeline of the one or more pipelines further comprises a set of data processing elements configured to execute a set of operations associated with generating code that is to be a part of the software product.

16. The method of claim 15, wherein the at least one pipeline of the one or more pipelines comprising a set of data processing elements configured to execute a set of operations associated with generating code that is to be a part of the software product further comprises an extraction operation configured to extract information associated with at least one of developing and testing of the code, and wherein the extracted information is provided to the one or more content generation operations.

17. The method of claim 12, wherein the one or more content generation operations in each pipeline comprise one or more of a content check-in operation, a content validation operation, and a publishable content fragment generation operation.

18. A computer program product stored on a non-transitory computer-readable medium and comprising machine executable instructions, the machine executable instructions, when executed, causing a processing device to perform steps of:
managing, with a management module, one or more pipelines operatively coupled to the management module, each of the one or more pipelines respectively corresponding to one or more item lifecycle stages, wherein each pipeline of the one or more pipelines comprises a set of data processing elements configured to execute a set of operations associated with a corresponding one of the one or more item lifecycle stages, and further wherein at least a portion of the set of operations executed in each pipeline comprise one or more content integration operations to integrate at least one of content and code into a shared repository, and one or more content generation operations configured to generate a content fragment to automatically document the corresponding item lifecycle stage, the content fragment generation comprising:

iteratively receiving the at least one of content and code from the one or more item lifecycle stages, and checking the received at least one of content and code into a corresponding pipeline of the one or more pipelines;

iteratively validating the at least one of content and code; and generating the content fragment comprising a representation of the at least one of content and code in a standardize object notation format; and generating a document from at least a portion of content fragments generated by the one or more pipelines, wherein the document is generated by:

selecting, with the management module, a document format; and selecting, with the management module, one or more content fragments from each of the one or more pipelines to populate one or more portions of the document format;

wherein the document is generated for internal use, the document is verified, updated and re-integrated prior to being published to an information processing system, and wherein the document is generated for external use, the document is verified, updated, re-integrated, validated and approved for external sharing prior to being published for use external to the information processing system.

19. The computer program product of claim 18, wherein the one or more item lifecycle stages correspond to one or more stages associated with a lifecycle of a product associated with a given enterprise and comprise one or more of a product ideating stage, a product designing stage, a product developing stage, a product testing stage, a product marketing stage.

20. The computer program product of claim 19, wherein the product comprises a software product and the document generated from the content fragments generated by the one or more pipelines comprises a product description that documents information relating to the one or more lifecycle stages of the software product, and wherein at least one pipeline of the one or more pipelines further comprises a set of data processing elements configured to execute a set of operations associated with generating code that is to be a part of the software product.

\* \* \* \* \*